United States Patent
Dawood et al.

(10) Patent No.: US 10,450,750 B2
(45) Date of Patent: Oct. 22, 2019

(54) SELF-STRESSING SHAPE MEMORY ALLOY-FIBER REINFORCED POLYMER PATCH

(71) Applicant: University of Houston System, Houston, TX (US)

(72) Inventors: Mina Dawood, Cypress, TX (US); Mossab El-Tahan, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 175 days.

(21) Appl. No.: 15/550,297

(22) PCT Filed: Jan. 28, 2016

(86) PCT No.: PCT/US2016/015249
§ 371 (c)(1),
(2) Date: Aug. 10, 2017

(87) PCT Pub. No.: WO2016/130326
PCT Pub. Date: Aug. 18, 2016

(65) Prior Publication Data
US 2018/0023297 A1 Jan. 25, 2018

Related U.S. Application Data

(60) Provisional application No. 62/114,487, filed on Feb. 10, 2015.

(51) Int. Cl.
*B28B 23/04* (2006.01)
*E04C 5/07* (2006.01)
(Continued)

(52) U.S. Cl.
CPC .............. *E04C 5/073* (2013.01); *B23P 6/04* (2013.01); *B28B 23/043* (2013.01);
(Continued)

(58) Field of Classification Search
CPC ........ B32B 15/02; B32B 15/08; B28B 23/043; B28B 23/046; Y10T 29/49618;
(Continued)

(56) References Cited

U.S. PATENT DOCUMENTS 5,972,141 A * 10/1999 Ellyin ................. B23P 6/04
156/71

FOREIGN PATENT DOCUMENTS

JP      09-125178       5/1997
JP      09125178 A  *   5/1997

OTHER PUBLICATIONS

English Translation JP 09125178 Kii (Year: 1997).*
(Continued)

*Primary Examiner* — Jason L Vaughan
*Assistant Examiner* — Amanda Kreiling
(74) *Attorney, Agent, or Firm* — Jackson Walker LLP

(57) ABSTRACT

A self-stressing shape memory alloy (SMA)/fiber reinforced polymer (FRP) composite patch is disclosed that can be used to repair cracked steel members or other civil infrastructures. Prestressed carbon FRP (CFRP) patches have emerged as a promising alternative to traditional methods of repair. However, prestressing these patches typically requires heavy and complex fixtures, which is impractical in many applications. This disclosure describes a new approach in which the prestressing force is applied by restraining the shape memory effect of nickel titanium niobium alloy (NiTiNb) SMA wires. The wires are subsequently embedded in an FRP overlay patch. This method overcomes the practical challenges associated with conventional prestressing.

14 Claims, 16 Drawing Sheets

(51) Int. Cl.
  *B32B 15/02* (2006.01)
  *B32B 15/08* (2006.01)
  *B32B 27/38* (2006.01)
  *C22C 1/00* (2006.01)
  *E04G 23/02* (2006.01)
  *B23P 6/04* (2006.01)
  *B29C 73/10* (2006.01)
  *E04C 5/08* (2006.01)
  *B29K 305/08* (2006.01)
  *B29K 307/04* (2006.01)

(52) U.S. Cl.
  CPC ............ *B28B 23/046* (2013.01); *B29C 73/10* (2013.01); *B32B 15/02* (2013.01); *B32B 15/08* (2013.01); *B32B 27/38* (2013.01); *C22C 1/00* (2013.01); *E04C 5/085* (2013.01); *E04G 23/0218* (2013.01); *B29K 2305/08* (2013.01); *B29K 2307/04* (2013.01); *E04G 2023/0255* (2013.01)

(58) Field of Classification Search
  CPC ......... Y10T 29/49638; Y10T 29/49718; Y10T 29/49732
  See application file for complete search history.

(56) References Cited

OTHER PUBLICATIONS

International Preliminary Report on Patentability and Written Opinion of the International Searching Authority issued for International Application No. PCT/US2016/015249, WIPO, dated Aug. 15, 2017; 7 pages.

* cited by examiner a)

b)

(a)

(b)

SELF-STRESSING SHAPE MEMORY ALLOY-FIBER REINFORCED POLYMER PATCH

This application claims priority to U.S. Provisional Patent Application Ser. No. 62/114,487, entitled "Self-Stressing Shape Memory Alloy-Fiber Reinforced Polymer Patch," filed on Feb. 10, 2015, the entire contents of which are hereby incorporated by reference.

The present invention used in part funds from the National Science Foundation (NSF), No. 1100954. The United States Government has certain rights in the invention.

BACKGROUND

This disclosure pertains to patches for repairing damage to structures, namely, self-stressing patches that use a combination of shape memory alloys (SMAs) and fiber reinforced polymer (FRP) composites.

Fatigue cracks form in steel structures due to cyclic loads such as wind, traffic, or machinery vibration. Under repeated loading cracks form and propagate which may compromise the integrity of the structure. Fatigue cracks initiate at locations of stress concentration such as notches, welded details or holes. Traditional methods of repairing cracked steel structures include bolting steel cover plates, drilling crack-stop holes (crack blunting), peening, or repair welding. The basic principal behind these approaches is to provide an alternate load path for stresses to bypass the crack tip, reduce the magnitude of stress concentrations near the crack tip, and/or to provide a residual compressive stress field near the crack tip to slow or halt crack propagation. However, these techniques require the use of heavy equipment and are often prone to crack re-initiation. Further, welding may be prohibited in some applications where there is a risk of explosion. Furthermore, all of these techniques require permanent, irreversible modification of the underlying structure.

Patching cracked steel members with fiber reinforced polymer (FRP) materials, is emerging as an effective alternative to repair cracked steel structures. Externally bonded FRP patches do not require welding or bolting, can be applied without permanently modifying the parent structure, do not corrode, and add little dead load to the repaired member. Using this technique, the FRP patch is bonded across the crack with a structural adhesive. The FRP bridges the crack and reduces the stress range near the crack tip. The effectiveness of this repair method can be improved by prestressing the FRP patch thereby providing compressive stresses near the crack tip. Research has shown that using prestressed CFRP patches can completely halt crack propagation and extend the fatigue life of cracked steel members. However, the prestressing operation typically requires hydraulic jacks, pumps, and complex fixtures which can limit the applicability of this method in many practical applications. Some alternative approaches have been proposed which involve the use of specialized fixtures and threaded rods to achieve the prestressing force. However, these techniques are generally designed for global prestressing of an entire member rather than localized patching at a discrete crack location.

What is needed, therefore, is an improved device or method for applying prestressing forces to a FRP patch.

SUMMARY

The present disclosure relates generally to a self-stressing shape memory alloy (SMA)/fiber reinforced polymer (FRP) composite patch that can be used to repair cracked steel members or other civil infrastructures. Prestressed carbon FRP (CFRP) patches have emerged as a promising alternative to traditional methods of repair. However, prestressing these patches typically requires heavy and complex fixtures, which is impractical in many applications. This disclosure describes a new approach in which the prestressing force is applied by restraining the shape memory effect of SMAs, such as ternary nickel titanium niobium alloy (NiTiNb) SMA wires. The wires are subsequently embedded in an FRP overlay patch. This method overcomes the practical challenges associated with conventional prestressing.

Shape memory alloys (SMAs) are a unique class of material which exhibit unique thermo-mechanical characteristics. Below a critical temperature, application of a mechanical strain induces a reorientation of the crystal structure from "twinned" martensite to "detwinned" or oriented martensite. This reorientation results in a built-in deformation upon unloading similar to yielding of traditional metals. Upon heating to a level above a critical temperature, the crystal structure undergoes another change from a martensitic to an austenitic state. This transformation relieves the built-in strain, thereby allowing the SMA to return to its undeformed shape. Upon cooling the crystal structure returns to the "twinned" state with no residual strain. This process gives SMA materials their unique "shape memory" properties. Large stresses can be induced by restraining the thermally-induced shape transformation. A similar transformation cycle, which is induced by application and removal of stress above a critical temperature, is responsible for the "super-elastic" effect of SMAs.

SMAs have been embedded in composites to control the position of a composite beam, increase the buckling capacity of composites, and tune the vibration response of composite components. SMAs have also been used to apply prestressing forces to concrete beams, and to apply active confinement to concrete columns. They have not been used in combination with an FRP patch for repair of cracked steel structures.

SMAs that can be used include iron-based SMAs (ex/ FeMnSi). Depending on the required installation and operating temperatures, traditional binary NiTi alloys could also be used. Fundamentally, any SMAs that can provide a sustained recovery force at the desired operating temperature could be used. Further, while small diameter, straight circular wires are preferably used, other shapes could also be used such as ribbons, bent or twisted wires or wires with other cross-section shapes.

The fiber reinforced polymer (FRP) can be any FRP that includes carbon fibers embedded in an epoxy-based saturating resin. In structural applications, carbon FRP (CFRP) and glass FRP (GFRP) are most common, although aramid FRP (AFRP), steel FRP (SFRP) and basalt FRP (BFRP) could also be used.

The present disclosure preferably utilizes ternary NiTiNb SMAs. While binary NiTi alloys are well established, they have relatively low transformation temperatures and narrow thermal hysteresis. This limits their suitability for applications which require sustained recovery forces at or near room temperature. Ternary NiTiNb SMAs have been developed to ensure a wide thermal hysteresis with high activation temperatures, making them well suited for applications that require sustained recovery forces at or near room temperature.

In the present self-stressing SMA/FRP composite patch, the shape memory effect of the wires, such as NiTiNb wires, is restrained to apply the prestressing force while an FRP overlay is applied to bridge the crack. Embodiments of the self-stressing SMA/FRP composite patch consist of three main constituents: NiTiNb SMA wires to apply the prestress force, fibers to bridge the cracks, and adhesive to bond the SMA wires on either side of the cracks. The self-stressing patch preferably embeds prestrained SMA wires into two FRP tabs. The cured tabs can be bonded to a cracked steel element or other type of structural component using a structural adhesive that will effectively anchor the SMA wires to the structure on either side of the crack as shown in FIG. 1. Other types of anchors such as mechanical fasteners could also be used. The NiTiNb SMA wires can then be activated by application of direct heat or electrical current thereby providing a prestressing force. An FRP overlay may or may not be subsequently bonded to the repaired member to bridge the crack.

DETAILED DESCRIPTION OF PREFERRED EMBODIMENTS

The present disclosure relates to a self-stressing shape memory alloy (SMA)/fiber reinforced polymer (FRP) patch for repair of civil infrastructure. The prestressing force is applied by restraining the shape memory effect of SMA wires, preferably NiTiNb SMA wires, that are embedded in an FRP patch.

Figure 1:
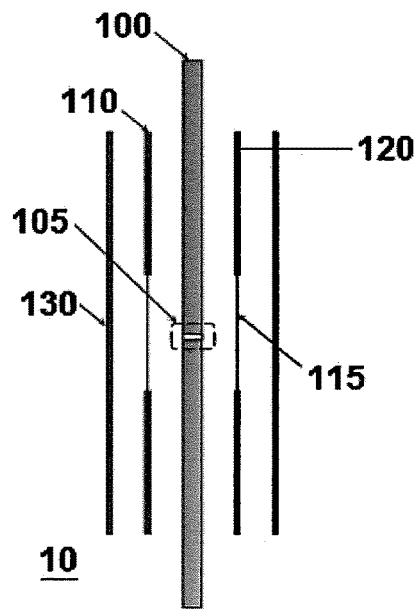
FIG. 1 shows a schematic drawing of an example of the self-stressing SMA/FRP patch (a) in a side, exploded view and (b) as applied to a cracked steel element.
Figure 1:
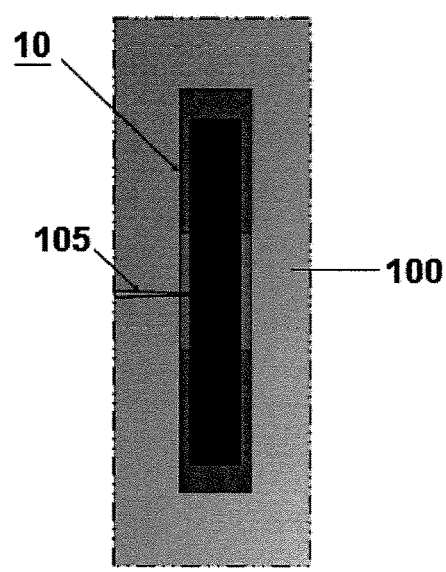

FIG. 1(a) shows a side, exploded view of the self-stressing SMA/FRP composite patch 10. At the center is the steel element 100 having a crack 105 in its central portion. On both sides of the steel element 100 is a self-stressing SMA patch 110 which is made up of the SMA wires 115, which run the length of the patch, and the FRP tabs 120 which are located on both ends of the SMA wires 115. An adhesive is used to affix the FRP tabs 120 to the steel element 100 on either side of the crack. The self-stressing SMA patches 110 should be affixed in a prestrained condition, then heated to induce the shape recovery of the SMA wires 115, creating a prestressing condition on the steel element 100. An FRP overlay 130 is then applied over the self-stressing patch 110. FIG. 1(b) shows a view of the self-stressing SMA/FRP composite patch 10 as it is applied to steel element 100 having crack 105.

A preferred embodiment of a self-stressing composite patch includes FRP tabs having a length of about 180 mm, SMA wires having a length of about 300 mm, and a terminal embedment length of the SMA wires into the tabs of about 100 mm. The patch may include about 10 to about 35 wires. However, these parameters may all be varied by design.

Preferred examples of the adhesive include any thermosetting polymeric structural adhesive. Specific examples include epoxy, vinyl ester, polyester, phenolic, or acrylic adhesives.

Previous studies analyzing the effectiveness of patching cracked steel elements with prestressed and non-prestressed CFRP patches have shown that applying a non-prestressed FRP patch reduces the stress range in the retrofitted element but does not influence the stress ratio. The normalized stress ratio (far-field stress ratio in steel after repair divided by far-field stress ratio in steel before repair) for elements repaired with non-prestressed CFRP is 1.0. Applying a prestressed CFRP patch reduces the stress ratio. When the compressive stresses in the steel due to the applied prestressing force are equal to the minimum applied stresses due to fatigue loading, the stress ratio is reduced to zero. Previous research has demonstrated that this repair configuration can substantially increase the fatigue life of cracked steel structures. The magnitude of the fatigue life improvement is a function of several other factors, including the modulus of elasticity and geometry of the CFRP patch, but the prestressed CFRP patches increased the fatigue life by at least 5 times. In some cases, crack propagation was halted leading to an infinite fatigue life. A prestressing force on the order of 12 IN is comparable to prestressing force levels that have been demonstrated by other researchers to be effective in mitigating crack propagation in cracked steel elements. However, the magnitude of this force depends on many factors and on the specific application being considered.

The thermomechanical properties of the NiTiNb SMA material were evaluated, as well as appropriate and preferred adhesives for the patch. Two different types of epoxy adhesives with different elevated temperature post curing regimens were tested to evaluate their tensile properties at different ambient temperatures. The bond between SMA and the composite was evaluated through pull-out tests. The test parameters of the bond study were the wire embedment length, fiber type, and spacing between wires. The performance of the self-stressing patches was evaluated during activation and under monotonic tensile loading.

NiTiNb SMA wires were tested to evaluate their mechanical properties and the maximum recovery stress that can be achieved when heated. One complexity of developing the patch comes from the different mechanical and thermomechanical properties of each of the constituents. As the NiTiNb wires are heated, the surrounding adhesive may heat up, leading to possible degradation in its mechanical properties and debonding of the SMA wires from the FRP tabs. Thus a complete loss in the recovery force could occur. Hence, evaluation of mechanical properties of the adhesive at different temperatures is essential.

Example 1. Evaluation of Materials

NiTiNb Shape Memory Alloy Wires

Figure 2:
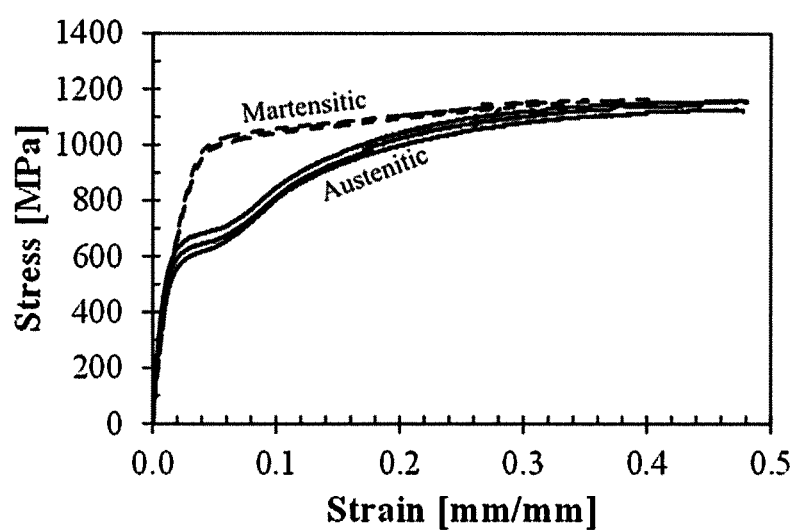
FIG. 2 shows stress-strain curves of tested NiTiNb SMA wires.

NiTiNb SMA wires were received in a prestrained condition and with a grit blasted surface. The diameter of the wire after grit blasting was 0.77 mm. The wire was provided in discrete 1370 mm long pieces. The wires were prestrained to 0.11 mm/mm prior to delivery with a recoverable strain of 0.056 mm/mm upon heating. The reported austenitic start temperature ($A_s$) was 47° C.+/−5° C. The manufacturer recommended heating the wire up to 165° C. to ensure full transformation of the wires and to maximize the recovery force. Six samples of the NiTiNb wire were tested in tension to evaluate the mechanical properties of the wire. Three wires were tested at room temperature prior to activation and three wires were tested after heating the wires to 165° C. then cooling to room temperature. FIG. 2 shows the stress-strain relationships of the tested wires.

The recovery force of restrained NiTiNb wires was measured. Individual 254 mm long wires were restrained in a rigid test frame and heated to measure the maximum recovery force. Two electrodes were installed 76 mm apart at the center of the wire. The NiTiNb was activated by running an initial current of 3 amps through the wire, and increasing the current in increments of 0.5 amps until the recovery force stabilized at 7.5 amps. The recovery force was measured using a 1.1-kN load cell while the temperature of the wire was measured by two electrically insulated thermocouples that were bonded to the wire between the two electrodes. A seating load of 8.9 N was applied prior to heating.

Figure 3:
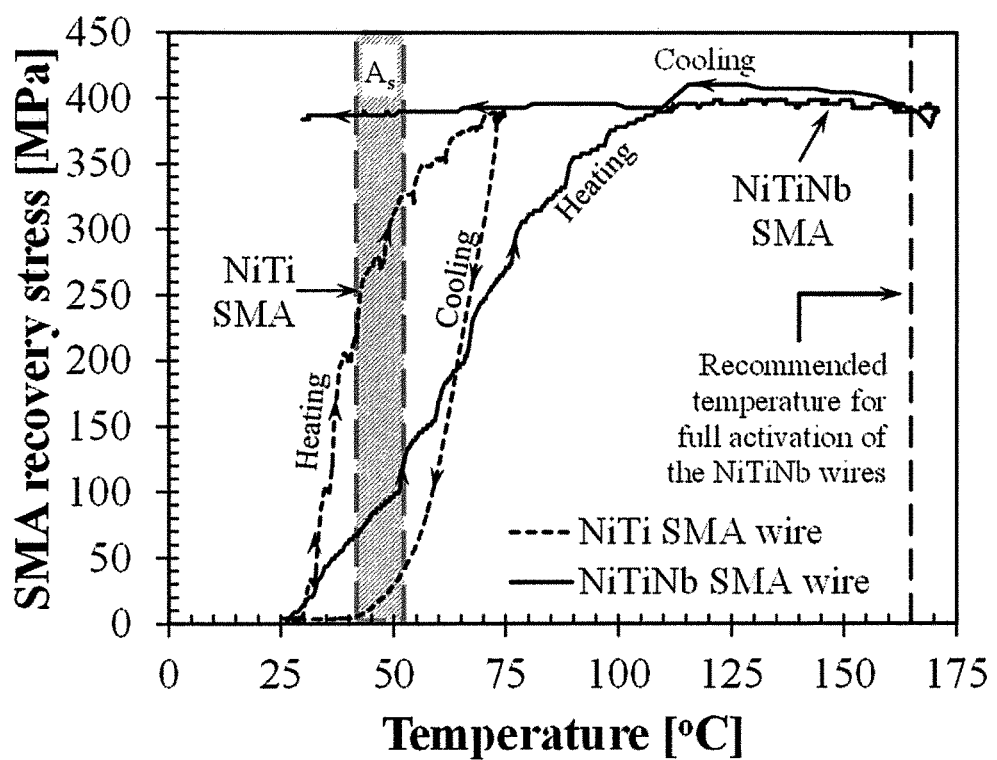
FIG. 3 shows the relationship between NiTiNb recovery stress and wire temperature.

FIG. 3 shows the relationship between the SMA recovery stress and the wire temperature. The figure shows the response of the NiTiNb wires used in this example and the response of a martensitic NiTi wire that was tested for comparison purposes. Inspection of FIG. 3 indicates that the recovery stress in the NiTiNb wire increased continuously with the increase of temperature up to a temperature of 113° C. After this stage, the recovery stress remained constant at 390 MPa. The wire stress remained essentially constant during cooling back to room temperature, unlike the NiTi SMA. This illustrates the ability of the NiTiNb wire to sustain significant recovery stresses even upon cooling to room temperature.

Figure 4:
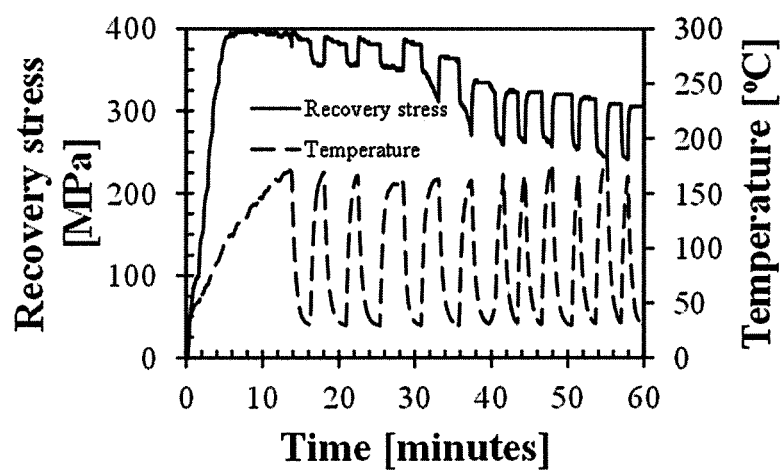
FIG. 4 shows (a) thermal loading protocol with corresponding recovery stress, and (b) recovery stress of NiTiNb measured after cooling to 25° C.
Figure 4:
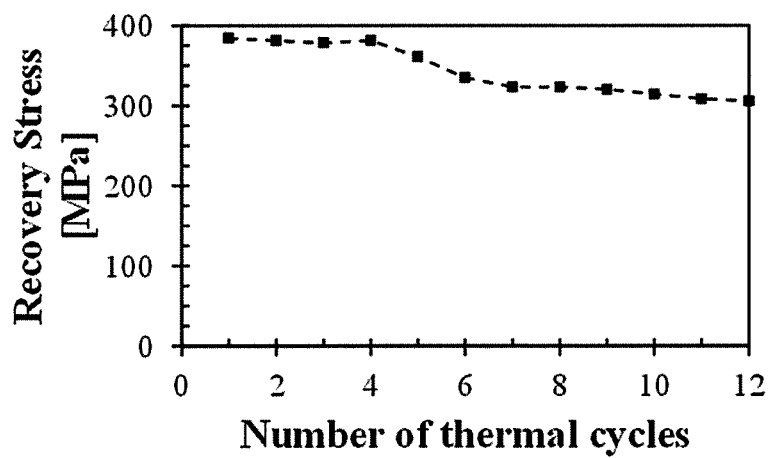

To investigate the stability of the recovery force during cyclic heating and cooling, one wire was subjected to 12 thermal cycles. In each cycle, the wire was heated to 165° C. then cooled to room temperature. The applied temperature profile and the corresponding recovery stresses are shown in FIG. 4(a) while the degradation of the room-temperature recovery stress with the number of thermal cycles is presented in FIG. 4(b). Inspection of FIG. 4 indicates that the wire maintained a stable recovery stress during the first four thermal cycles with gradual relaxation during the fifth and sixth cycles. Afterwards, the recovery stress remained stable at 315 MPa. It can be concluded from this test that a reduction in the recovery stress may occur during repeated extreme heating of the wire. This suggests that the wires should be protected against extreme heat. However, the maximum temperatures experienced by most civil structures during service are typically below 40° C., and are not expected to cause any significant degradation of the recovery stress.

Saturating Resins

Two different epoxy-based saturating resins were considered. Both were low-viscosity, two-part resins with ambient temperature cure cycles and optional elevated temperature post-cure treatments. Any thermosetting polymeric structural resin could be used. Common resins used in structural applications are thermoset resins such as phenolic resin, polyester resin, acrylic resin, epoxy resin and vinylester resin. A similar procedure could be used on any other type of resins as described below to evaluate the properties of the resin at different temperatures and to confirm the bond performance between the FRP and the SMA wire.

In this example, Adhesive 1 was the TYFO® S epoxy saturating resin produced by Fyfe Co. LLC (San Diego, Calif.). Adhesive 2 was Araldite LY 5052-1/Aradur 5052-1 epoxy resin produced by Huntsman Advanced Materials (The Woodlands, Tex.).

A total of 60 cured resin coupons were tested to evaluate their tensile moduli at different temperatures. The selected temperatures cover the expected range of service temperatures for the patches that are considered in this study. The effect of post curing the resin on enhancing the tensile modulus of the epoxy was also considered. Table 1 shows the test matrix of the resin tensile tests. Adhesive 1 was cured at 25° C. for seven days then tested in tension at 25° C. and 45° C. Four sets of specimens were made from Adhesive 2. The first set was cured at 25° C. for 7 days and tested at 25° C., 45° C., and 60° C. The second, third and fourth sets were cured at 25° C. for 24 hours then post cured at 45° C., 60° C., and 75° C. for 24 hours, respectively. Samples from each set were then tested at 25° C., 45° C., 60° C., 75° C., and 100° C.

TABLE 1

Epoxy test matrix

| | Maximum Curing Temperature [° C.] | Testing Temperature [° C.] |
|---|---|---|
| Adhesive 1 | 25 | 25, 45 |
| Adhesive 2 | 25 | 25, 45, 60 |
| | 45 | 25, 45, 60, 75, 100 |
| | 60 | 25, 45, 60, 75, 100 |
| | 75 | 25, 45, 60, 75, 100 |

A 22-kN load cell was used to measure the applied load, while an extensometer with an initial gage length of 13 mm was used to measure the elongation of the epoxy during testing. The coupons were heated in a frame-mountable environmental chamber with a maximum temperature capacity of 204° C. The chamber was set to the desired testing temperature and the internal temperature was allowed to achieve a steady state. The epoxy coupon and the extensometer were placed inside the environmental chamber and thermally soaked for 20 minutes.

Figure 5:
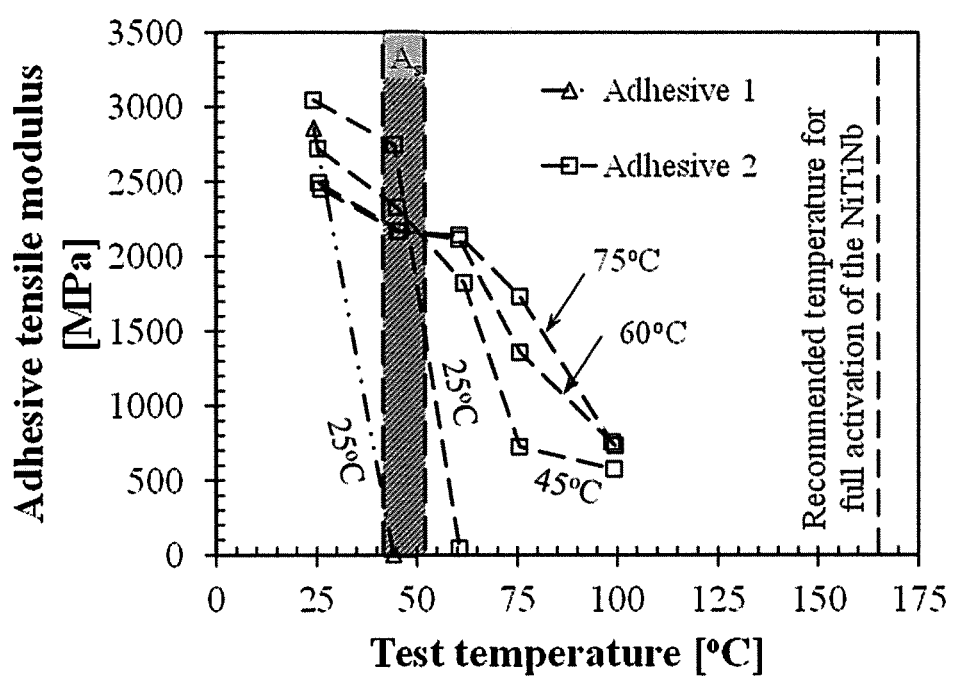
FIG. 5 shows the relationship between the tensile modulus of tested adhesives versus temperature.

Inspection of FIG. 5 indicates that a substantial degradation in the tensile modulus was observed as the ambient testing temperature increased. It was observed during testing that the specimens cured at 25° C. room temperature and tested at 45° C. and 60° C. that were fabricated from Adhesive 1 and Adhesive 2, respectively, softened to the extent that the weight of the extensometer caused excessive deformation. The tensile moduli of these samples were taken as zero. Inspection of FIG. 5 indicates that both adhesives exhibit a dramatic reduction of their elastic moduli at temperatures near the austenite start temperature ($A_s$) of the NiTiNb wires. The softening temperature of both adhesives is lower than the reported glass transition temperatures ($T_g$). It can be seen in the figure that post curing of the resin resulted in only a slight increase of the elastic moduli of the adhesives at elevated temperatures. Since the post-cure temperatures were above the austenitic start temperature of the SMA, this curing regime would likely cause partial activation of the SMA wires in the patch. As such, elevated temperature post-cure cycles are not recommended for the proposed application. Since Adhesive 2 retained a larger percentage of its room temperature modulus at temperatures above the austenite start temperature of the NiTiNb wires, it was selected for further consideration in the patch development.

Fiber-Reinforced Polymers

The reported tensile strength, tensile modulus, elongation, density, and aerial weight of the carbon fiber fabric and glass fiber fabric used in this research were 3790 MPa, 230 GPa, 0.017 mm/mm, 1.79 gm/cm$^3$, and 644 gm/m$^2$; and 3240 MPa, 72.4 GPa, 0.045 mm/mm, 2.55 gm/cm$^3$, and 915 gm/m$^2$, respectively. CFRP and GFRP tension coupons were fabricated by wet lay-up using Adhesive 2. Three coupons of each type were tested at room temperature with a displacement rate of 0.4 mm/min to determine their elastic moduli. The elastic modulus of the CFRP and GFRP were determined as 93.6 GPA and 27.9 GPa, respectively.

Example 2. Bond Behavior

Figure 6:
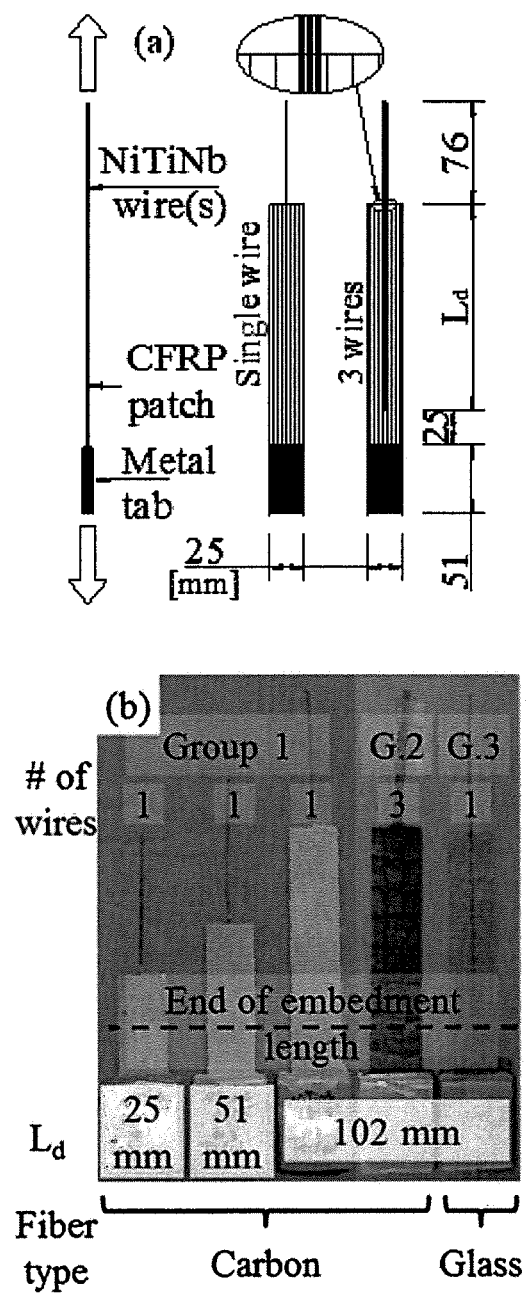
FIG. 6 shows (a) pull-out specimen dimensions and details, and (b) pull-out specimens after fabrication.

A total of 15 pull-out specimens were fabricated and tested to examine the NiTiNb-to-FRP bond behavior. FIG. 6(a) shows the pull-out specimen dimensions and details, while FIG. 6(b) shows the specimens after fabrication. Table 2 summarizes the test matrix for the pull-out. The pull-out specimens were divided into three groups, as shown in FIG. 6(b). The first group was tested to evaluate the minimum embedment length required to fully develop the tensile forces in the NiTiNb wire. In the second group, the interaction between adjacent wires was examined for specimens with three NiTiNb wires embedded in a CFRP patch with a wire spacing of 0.89 mm. In the third group, the effect of the FRP type on the pull-out behavior of a single wire was examined. The wires were embedded in a 25-mm wide FRP patch. Aluminum tabs were bonded to the end of the FRP patch and gripped in the testing frame. A clear distance of 25.4 mm was provided between the end of the embedded wires and the tabs to prevent interference in the bonded portion of the wire.

TABLE 2

Pull-out test matrix

|  | Fiber type | Embedment length [mm] | Number of embedded wires |
| --- | --- | --- | --- |
| Group 1 | Carbon | 25, 51, and 102 | 1 |
| Group 2 |  | 102 | 3 |
| Group 3 | Glass | 102 | 1 |

The applied load was measured using a 22-kN load cell. Two extensometers with initial gage lengths of 13 mm, and 51 mm were used to measure the elongation of the wire, and the relative displacement between the wire and the FRP, respectively. To help identify the onset and propagation of debonding, a digital image correlation (DIC) measurement system was used in addition to the conventional instrumentation. The DIC system consisted of two cameras, each with a resolution of 12 megapixels. A black and white speckled pattern was applied to the surface of the specimen. The system recorded images at a frequency of 1 Hz. Tension force was applied to the embedded NiTiNb wire at a displacement rate of 0.4 mm/min until complete debonding was observed.

Figure 7:
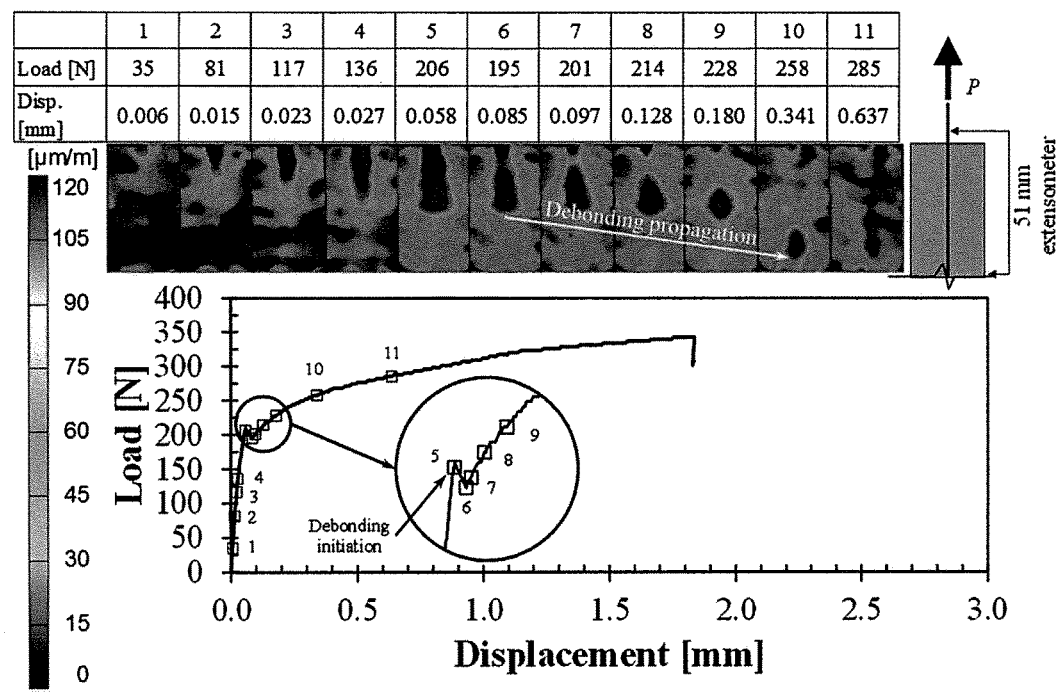
FIG. 7 shows load versus relative displacement for an example pull-out specimen with 1 NiTiNb wire embedment length of 102 mm embedded in CFRP patch.

The tested pull-out specimens exhibited an adhesive failure at the adhesive/SMA interface. FIG. 7 shows the combined test results from both measurement systems for the specimen with a single NiTiNb SMA wire with an embedment length of 102 mm inside a CFRP patch. The figure presents the relationship between the applied load and the relative displacement between the SMA wire and the CFRP patch. FIG. 7 also shows the longitudinal strain contours obtained from the DIC system. Square markers on the load-displacement curve indicate the stages at which the DIC system captured each strain contour image. Inspection of the strain contours indicates the presence of a strain concentration at the location of the wire. As loading continued, the size and intensity of the strain concentration increased, up to a load of 206 N. At that stage a clear shift of the strain concentration away from the edge of the CFRP patch was observed. This indicates the initiation of observable debonding of the wire. The debonding propagated along the embedment length of the SMA wire, as indicated by the shift of the location of this strain concentration. The load-displacement relationship indicates that response was linear until debonding initiated at a load of 206 N, which was observed as a slight drop in the applied load. This is consistent with the DIC observation of debonding. After debonding, the load continued to increase, although at a lower rate, until a complete debonding was achieved at a load of 342 N and relative displacement of 1.84 mm. A similar trend was observed for all of the tested specimens.

Figure 8:
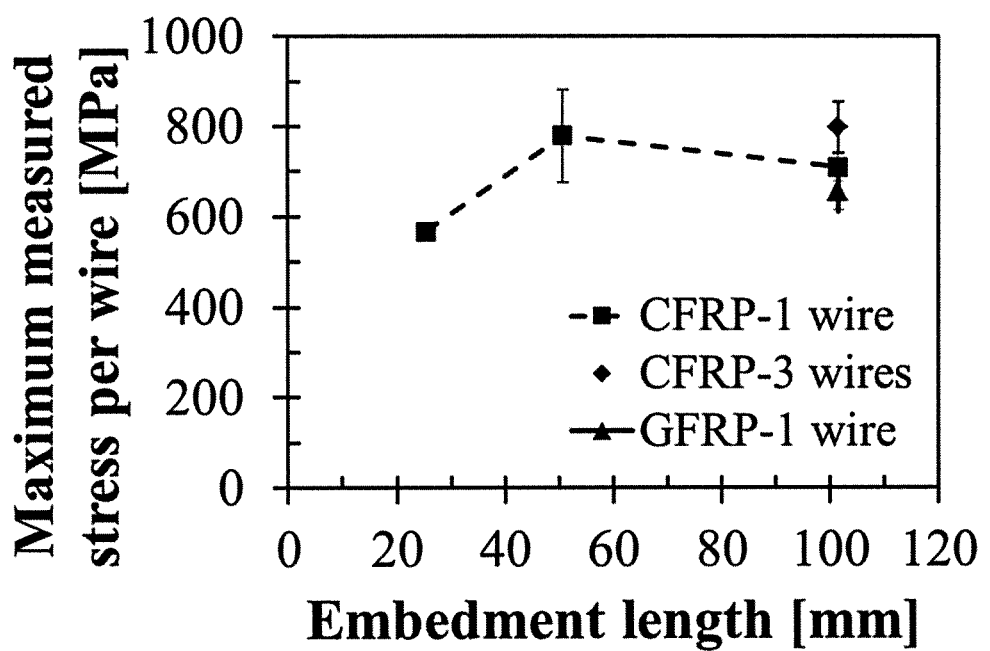
FIG. 8 shows maximum measured stress versus embedment length for all pull-out specimens tested.

FIG. 8 shows the maximum wire stress as a function of the embedment length of the wires for all of the tested pull-out specimens. Each point on the figure represents the average of the maximum measured stresses for three similar specimen configurations. The error bars in the figure indicate the range of the measured results. Inspection of FIG. 8 indicates that the minimum embedment length required to develop the maximum stress in a NiTiNb wire that is embedded in a CFRP patch is 51 mm. The maximum stress achieved in NiTiNb wires embedded in GFRP patches was 8% lower than that for NiTiNb wires embedded in CFRP patches. The maximum measured stress for the specimens with three NiTiNb wires embedded in 102 mm into CFRP patch is 13% greater than the stress for similar specimens with a single wire embedded in a CFRP patch. This suggests that a wire spacing of 0.89 mm, or 1.2 times the wire diameter, is sufficient to eliminate the interaction between the wires.

Example 3. Wire Activation and Thermal Transfer

The recommended temperature for full activation of the NiTiNb wire is 165° C., higher than the measured softening temperatures of either of the tested epoxies. For the proposed patch configuration the SMA wires can be activated by heating the exposed portion of the wires to generate the prestressing force. This eliminates the challenges associated with softening of the epoxy. Heating can be achieved by two mechanisms: by applying an electrical current to the wire or by application of direct heating using a forced air heat gun.

Figure 9:
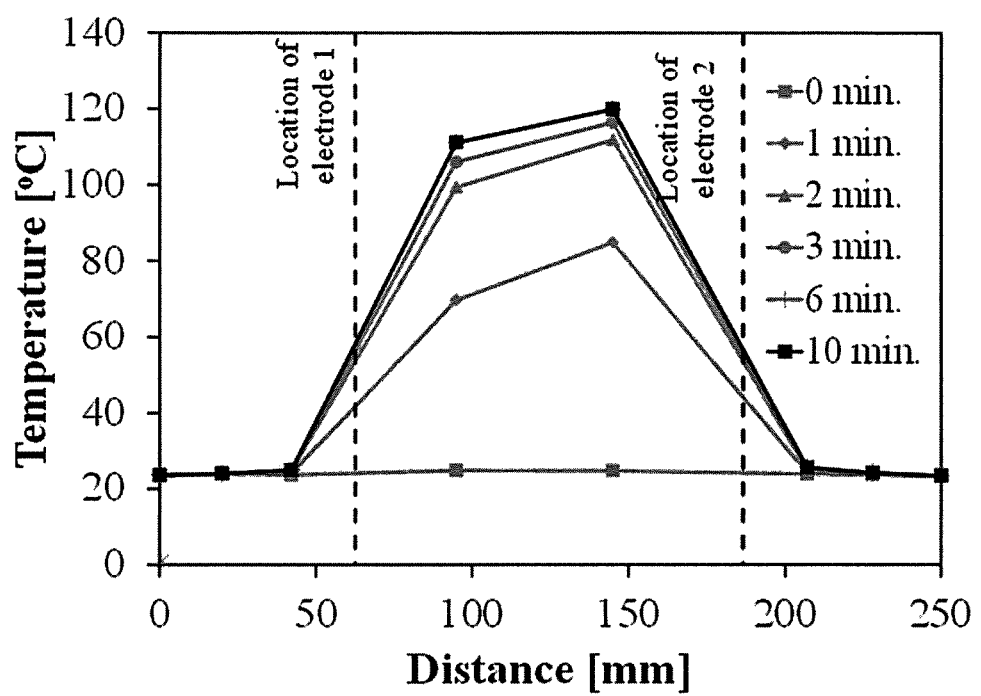
FIG. 9 shows the results of a thermal transfer test for tested NiTiNb wires.

A 255-mm NiTiNb wire was tested to study the possible epoxy softening in the bonded region due to heat transfer by thermal conduction through the SMA. The temperature along the wire was measured using electrically insulated thermocouples, as shown in FIG. 9(a). Two electrodes were attached to the wire with a spacing of 125 mm. The measured temperature profiles at different time intervals along the length of the wire are plotted in FIG. 9(b). Inspection of the figure indicates that the temperature of the wire between the two electrodes reached nearly 120° C. However, immediately outside of the electrodes, the temperature of the wire did not change even after 10 minutes of heating. This indicates that electrically heating the SMA wires is a viable alternative for the proposed configuration. Direct heating using forced air was considered by testing a completed patch as described in the example below.

Example 4. Validation of Patch Response

Figure 10:
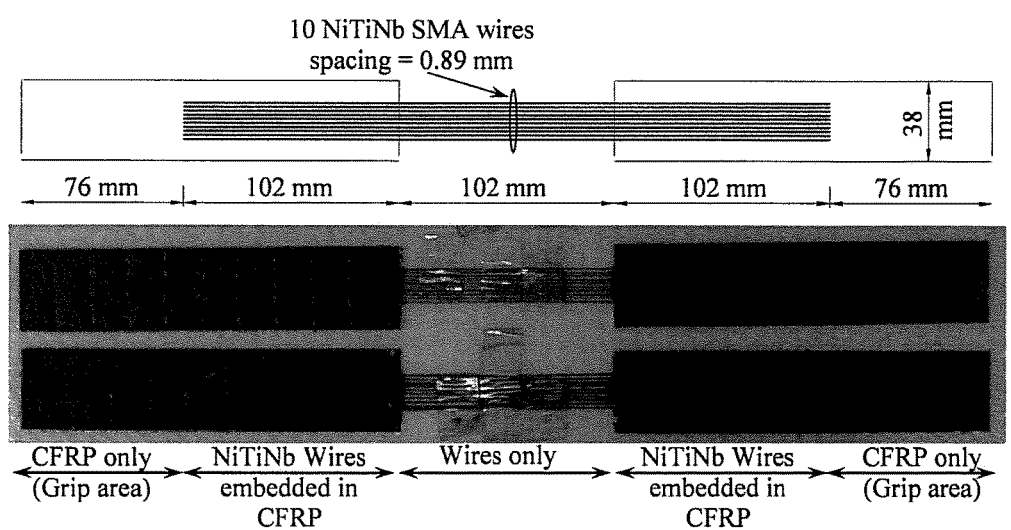
FIG. 10 shows the specimen details and dimensions of an example self-stressing SMA/FRP patch.

Two self-stressing patches were fabricated and tested to evaluate: (a) the maximum recovery force that the patch can generate upon activating the NiTiNb wires, and (b) the remaining load carrying capacity that a patch can have after activation of the wires. FIG. 10 shows the dimensions and details of the self-stressing patch. The self-stressing patch consisted of 10 NiTiNb wires each 305 mm long and spaced with a clear distance of 0.89 mm. The wires were embedded in CFRP, and the embedded length was 102 mm. The central 102 mm long portion of the wires was exposed to allow room to activate the SMA wires. Aluminum tabs were bonded to the CFRP and gripped in the testing frame. A clear distance of 25.4 mm was provided between the end of the embedded wires and the metal tabs.

A 2.25-kN load cell was used to measure the load, and two thermocouples were mounted on the wires to monitor the temperature. The wires were heated directly using forced air as an alternative to electrical heating. Fiber glass insulation was placed around the CFRP to prevent softening of the epoxy. Thermocouples were installed underneath the insulation to monitor the temperature of the CFRP surface during activation.

Figure 11:
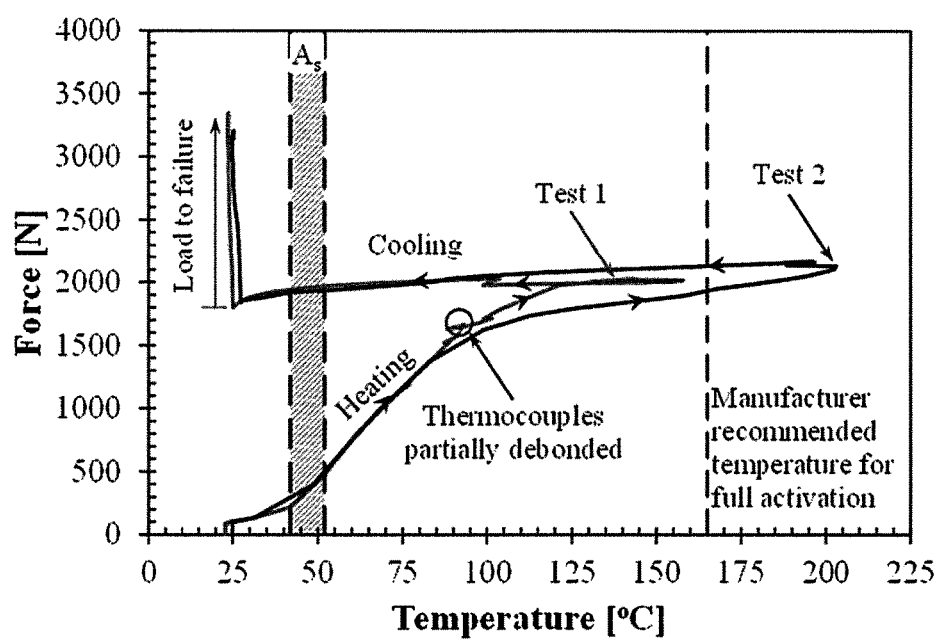
FIG. 11 shows the force measured upon heating an example self-stressing SMA/FRP patch before loading until failure.

A seating load of 89 N was applied to the specimens prior to heating the wires. FIG. 11 shows the thermomechanical response of the patch. Upon heating, recovery forces of 1927 N and 2035 N were measured for the first and the second patch, respectively. During heating of the first specimen the thermocouples debonded from the SMA wires when the temperature reached 158° C. However, the results indicate that the wires were fully activated at this stage. After the patches cooled down, sustained recovery forces of 1710 N and 1750 N were measured at room temperature for the first and second patches, respectively. After the patches cooled, they were loaded monotonically in tension to failure. The measured failure loads were 3350 N and 3210 N for the first and second patches, respectively. A debonding failure was observed in both specimens as the SMA wires pulled out of the FRP tabs. The measured recovery forces were 51% and 55% of the measured failure loads of the two patches respectively, indicating a substantial margin of safety. These tests demonstrate that the proposed patches can be used to easily generate large prestressing forces using simple tools rather than using heavy equipment as required by traditional prestressing methods. Based on these results, scaling up the patch to achieve a double-sided repair using two 80-mm wide patches with 35 wires each would generate prestressing forces of approximately 12 kN, which is comparable to the configuration that has been previously used to extend the fatigue life of cracked steel elements.

Summary of Results

The results obtained in the examples above show that prestrained NiTiNb SMA wires are capable of generating recovery stresses of 390 MPa when heated while restrained. The NiTiNb SMA wires can sustain large recovery forces even after cooling to room temperature. Cyclic heating and cooling of NiTiNb wires up to 165° C. results in an 18% reduction of the sustained recovery force at room temperature after 12 cycles. However, cycling heating and cooling in the expected service temperature range for most civil infrastructure (up to 40° C.) is not expected to have any significant impact on the recovery force.

Two saturating resins were tested to evaluate their mechanical properties when tested at different ambient temperatures. Both epoxies were post cured at various temperatures to evaluate the effect of post curing on the mechanical properties of the epoxies. The softening temperature of Adhesive 1 was less than 45° C., while for Adhesive 2 the softening temperature was greater than 45° C. when cured at 25° C. for 7 days. Elevated temperature post-cure cycles increased the softening temperature of Adhesive 2 up to 75° C. depending on the post-cure temperature. As such, Adhesive 2 was determined to be more suitable for most typical civil infrastructure applications.

A critical development length of 51 mm was identified for the tested NiTiNb wires embedded in CFRP patches. Increasing the embedment length beyond this critical value did not result in any increase in the maximum stress that could be developed in the wires prior to debonding. Wires embedded in GFRP patches exhibited slightly lower maximum stresses than those embedded in CFRP patches. A wire spacing of 0.89 mm was sufficient to prevent premature debonding of the wires from CFRP patches due to unfavorable interactions of bond stresses between adjacent wires. The temperature required to activate the NiTiNb wires is 165° C., which is higher than the softening temperature of saturating resins. Targeted heating using electrical conduction or forced air was shown to be an effective means to activate the NiTiNb SMA wires without causing softening of the adhesive or debonding of the SMA wires.

Self-stressing patches with 10 NiTiNb wires embedded in CFRP were fabricated. A sustained prestressing force of up to 1750 N was measured at room temperature using this patch configuration. Scaling up the patch to two 80-mm wide patches with 35 wires each could generate prestressing forces of up to 12 kN which is comparable to the prestressing forces used by others to repair cracked steel elements. The maximum load carrying capacity of the tested patches when subjected to monotonic tensile loading was nearly twice the measured prestressing force. Failures that occurred were the result of debonding of the SMA wires from the CFRP anchorages.

Example 5. Prestressing Stability

The behavior of the whole self-stressing patch was evaluated in the previous examples when monotonic static loading was applied to the wires. In this example a total of 6 self-stressing patches were fabricated and tested to evaluate the stability of the prestressing force when the self-stressing patch is subjected to fatigue loading. The factors considered in this study were the prestress level in the NiTiNb SMA wires and the applied force range.

The self-stressing patches tested in this research consisted of 10 NiTiNb SMA wires, each was 305 mm long, embedded in CFRP at both ends. The embedment length was 102 mm. The spacing between the NiTiNb SMA wires was 1.8 mm and controlled by spacer wires to maintain straightness and control wire spacing. A total of 18 superelastic NiTi SMA wires with a diameter of 0.89 mm each were used as spacer wires to maintain the straightness of the NiTiNb SMA wires and to control the spacing between the wires. The SMA wires were provided in discrete pieces each ranging from 1200 mm to 1500 mm. The NiTiNb wires and the spacer wires were taped together, then cotton threads were used to affix the NiTiNb wires to the carbon fabric at four locations. After affixing the NiTiNb wires to the carbon fabric the spacer wires were removed. The carbon fibers along with the NiTiNb wires were saturated with epoxy and placed between two molds. The specimens were left for 7 days before demolding and trimming the edges of the self-stressing patch specimens. This general description of the fabrication process is provided for information purposes and is not the only way that this system could be fabricated.

Figure 12:
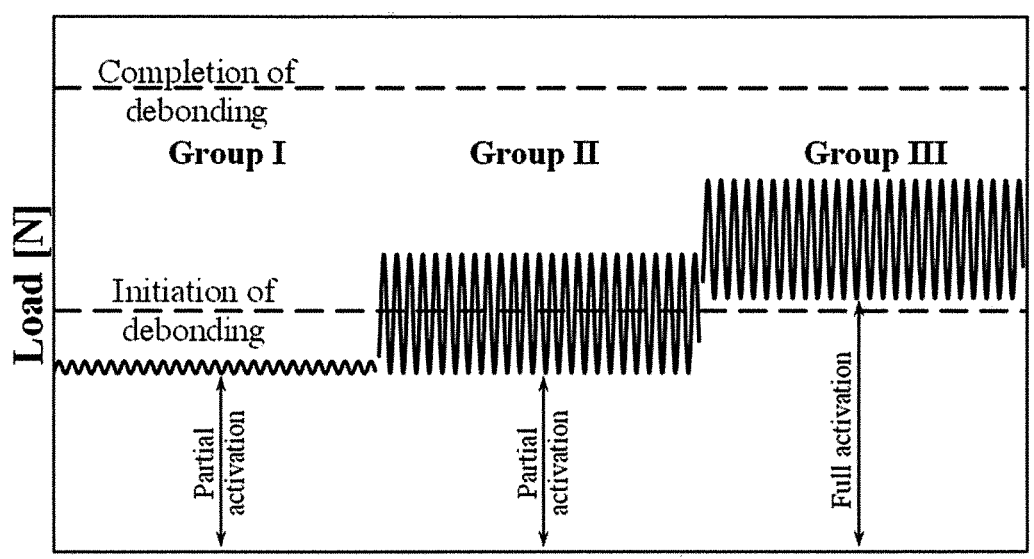
FIG. 12 shows a schematic drawing illustrating different load ranges and activation levels for three groups of samples.

The test matrix is summarized in Table 3 below. The test specimens were divided into three groups. In the first group the NiTiNb wires were partially activated to a recovery force of 1150 N. Two different force ranges, 90, and 930 N were considered and two repetitions of each loading group were tested. FIG. 12 illustrates the factors considered in the three tested groups. In the first group the SMA wires were partially activated and subjected to a force range of 90 N. The resulting maximum force applied to the wires was less than the force required to cause debonding between the epoxy and the wire. In the second group the SMA wires were partially activated to the same level as in Group I but the applied force range was 930 N. In this case the maximum force applied to the wires was more than the force required to cause debonding. In the third group, the SMA wires were fully activated and the force range was 930 N.

TABLE 3

Test matrix

| | $P_{min}$ [N] | $P_{max}$ [N] | $\Delta P$ [N] | Prestress level |
|---|---|---|---|---|
| Group I | 1090 | 1180 | 90 | Partial |
| Group II | 1160 | 2090 | 930 | Partial |
| Group III | 1740 | 2670 | 930 | Full |

The patches were tested in a 489 kN capacity, digitally controlled servo-hydraulic testing frame that was equipped with an in-line low capacity loading system with a capacity of 22 kN.

Figure 13:
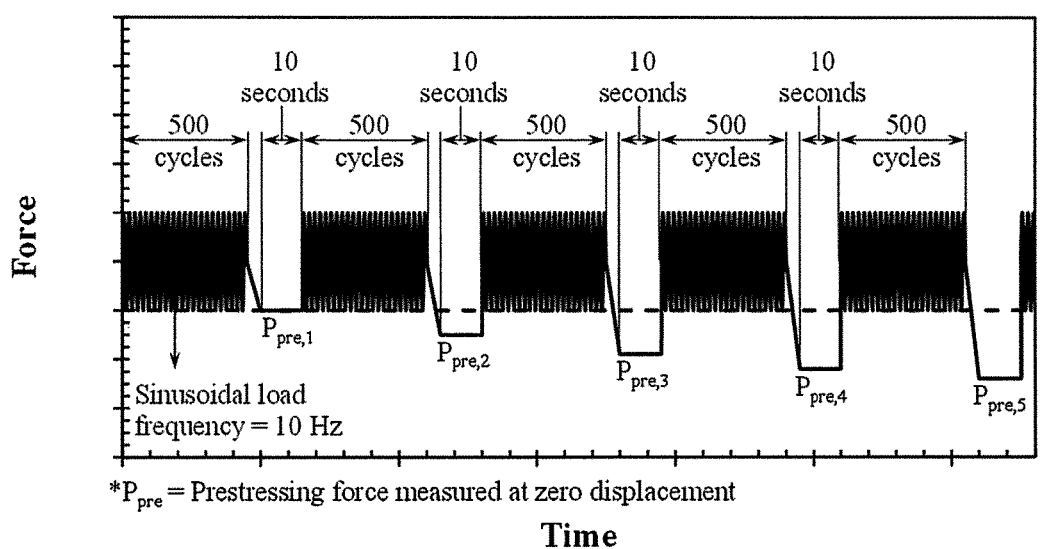
FIG. 13 shows a schematic representation of a loading protocol used for testing.

The test was conducted by applying a seating load of 89 N to the specimen. The NiTiNb SMA wires were activated to the desired level. FIG. 13 shows the loading protocol used in this test. A cyclic load was applied in load control at the target load range level for 500 cycles with a frequency of 10 Hz. Then the actuator was positioned to its set point (zero displacement location) in displacement control to measure the residual force in the SMA patch. The load was measured and recorded for 10 seconds. The cyclic loading resumed for another 500 cycles and the process was repeated up to 2 million loading cycles or until failure as shown in FIG. 13. The failure was defined when the actuator displaced 20 mm from the set point at the maximum applied load indicating pull-out or rupture of the SMA wires.

Figure 14:
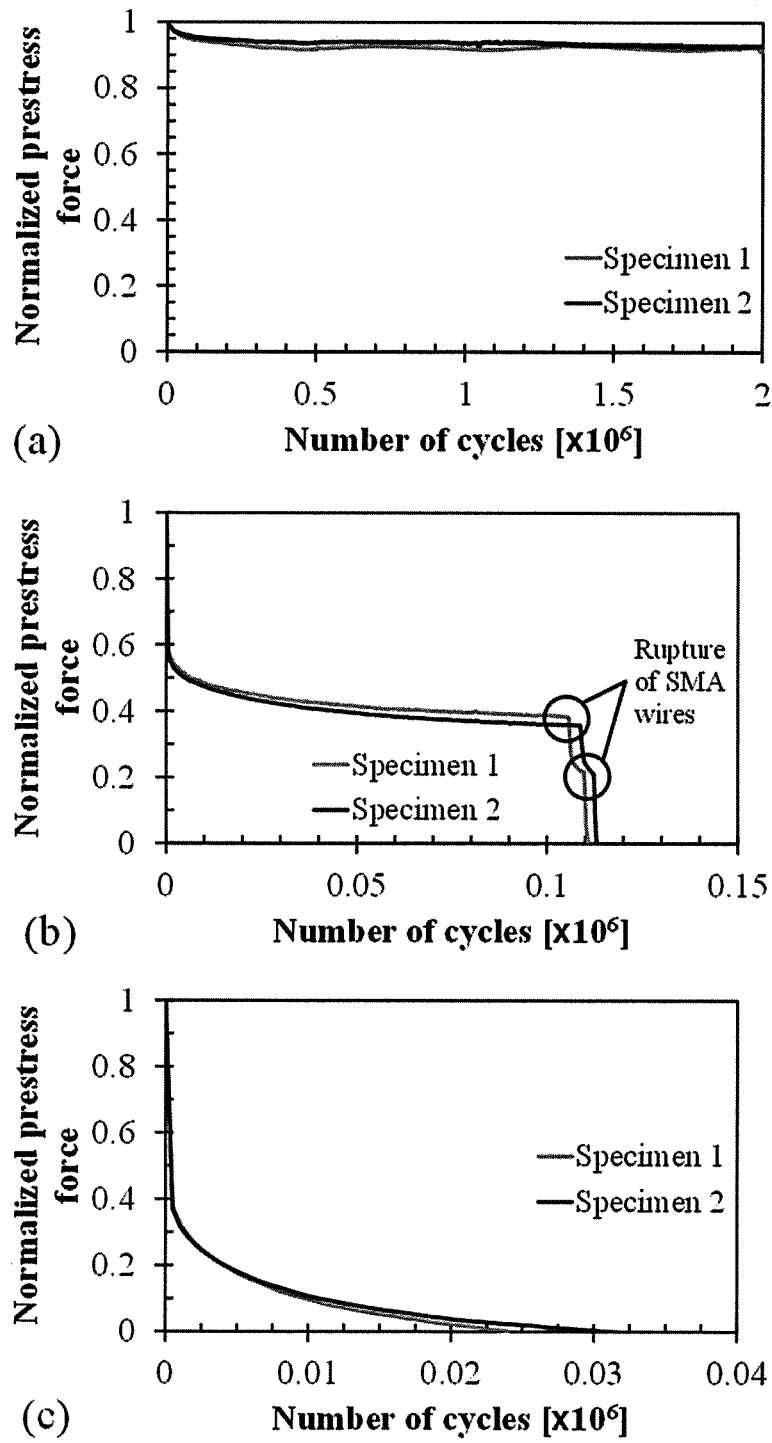
FIG. 14 shows the normalized prestress force versus the number of fatigue cycles for the sets of tested samples labeled (a) Group I, (b) Group II and (c) Group III.

All the specimens of Group II and Group III failed by rupture of one or more of the NiTiNb wires followed by a pullout of the remaining wires. Specimens in Group I were tested up to 2 million cycles with no sign of failure and were categorized as run-out specimens. FIG. 14 shows the degradation of the normalized prestressing force ($P_{pre,i}/P_{pre,0}$) with increasing number of loading cycles for the three tested groups. Inspection of FIG. 14(a) indicates that for the patches that were partially activated and tested at the lowest force range the prestressing force decreased by 8% within the first 500,000 cycles (most of which occurred within the first 100,000 cycles) after which the residual prestressing force remained constant up to 2 million cycles.

FIG. 14(b) shows the results for specimens of Group II which was partially activated and tested at the larger load range. It was observed that after the application of the first 500 fatigue cycles the prestress force decreased by 40% of its initial value. Afterwards, the prestress force gradually decreased and stabilized at 60,000 cycles at 40% of the original prestress force. Rupture of the first SMA wire was observed after 106,000 and 109,000 cycles for specimens 1 and 2, respectively. Rupture of the wires was accompanied by a sudden decrease of the residual prestressing force, initiation of debonding of the SMA wires and rupture of subsequent wires due to the increased demand on the intact wires. Failure, defined as 20 mm deformation of the actuator, was observed after 117,000 and 115,000 cycles for specimens 1 and 2, respectively.

FIG. 14(c) presents the test results of Group III which was fully activated and tested at the larger load range. As soon as the fatigue loading was applied debonding initiated and was observed as a small cracking sound. It was observed that after the application of the first 500 fatigue cycles the prestress force decreased by 60% of its initial value. The loss of the prestress force continued with cyclic loading until it was totally lost after 24,000 and 33,000 loading cycles for specimens 1 and 2, respectively. Failure of the patches, defined as 20 mm displacement of the actuator, occurred at 58,900 and 49,600 cycles for specimens 1 and 2, respectively.

Figure 15:
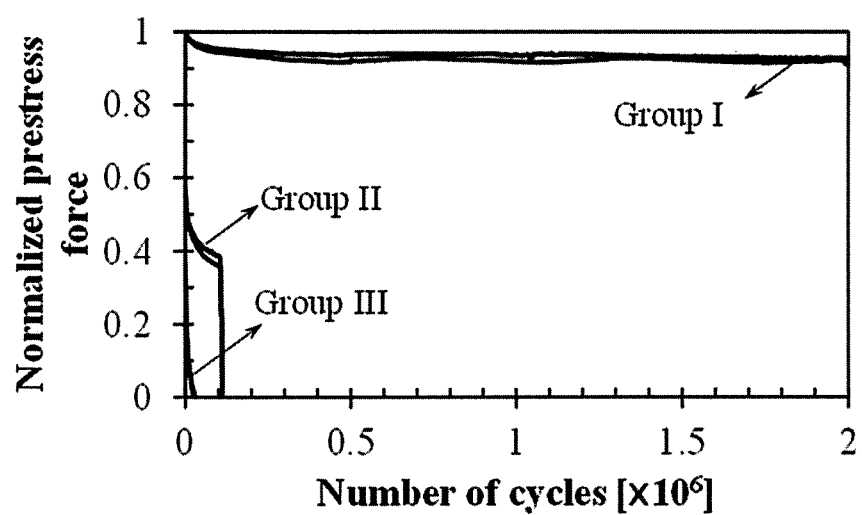
FIG. 15 shows a comparison of normalized prestress force versus fatigue life for the three sets of tested samples.

FIG. 15 presents the normalized prestress force versus the fatigue life for all the tested specimens. Inspection of the figure indicates that in the case of partial activation a longer fatigue life was achieved compared to full activation of the wires. In Group I minimal loss of prestressing force and no indication of failure were observed after 2 million loading cycles, while in Groups II and III an immediate and significant loss of prestress occurred after the first 500 cycles. The prestress loss in the latter two cases was attributed to the initiation of debonding which occurred during the application of the initial fatigue cycles. Debonding caused relaxation of the prestressing force in the exposed portion of the NiTiNb SMA wires.

In this example a self-stressing SMA/FRP patch was tested under fatigue loading to examine the stability of the prestress force generated by activating the NiTiNb SMA wires. Two different prestressing levels and three force ranges were considered in this study. Based on these tests the following conclusions can be drawn. First, a stable prestressing force can be achieved when the NiTiNb SMA wires are partially activated such that the maximum force during the application of fatigue loading is less than the force required to initiate debonding of the wire. In this case a minimal loss of prestressing force can be expected after 2 million loading cycles. Second, the self-stressing patch should be designed such that the maximum expected force per wire should be less than the force required to cause debonding as identified by representative pull-out tests (described previously).

Example 6. Cyclic Loading Tests

Cyclic loading tests were conducted on steel plates repaired with different configurations of SMA and carbon FRP (CFRP) materials. These were tested using different stress ranges (i.e., the difference between the maximum and minimum applied stresses) and constant stress ratio (i.e., the ratio of the minimum to maximum applied stresses). The test samples consisted of ¼"×4" wide steel plates with a shallow 60 degree notch cut into one edge to induce a stress concentration and drive crack initiation and propagation. The configurations that were tested included:
1) Plain steel samples (control);
2) Samples repaired with patches in which only CFRP bridged the crack;
3) Samples repaired with patches in which only SMA bridged the crack; and
4) Samples repaired with patches in which both SMA and CFRP bridged the crack.

Figure 16:
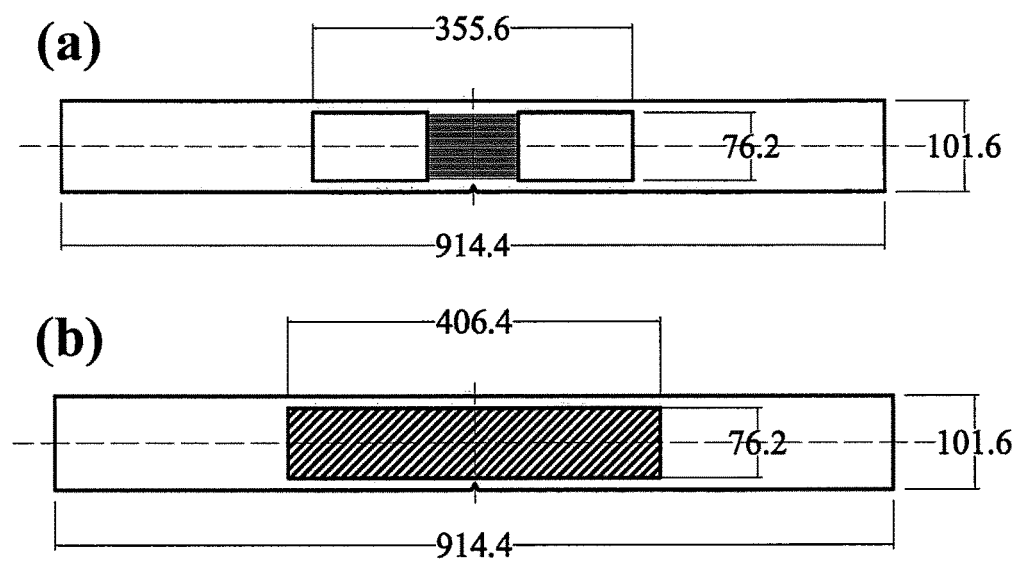
FIG. 16 shows examples of self-stressing composite patches in which (a) patches of CFRP were bonded on either side of a notched steel plate with SMA wires bridging the crack path and (b) an overlay of CFRP covers the example shown in (a).

The patches in which only SMA bridged the crack and in which both SMA and CFRP bridged the crack included embodiments of the present SMA/FRP patch. For each of those samples, two SMA/FRP patches were bonded to each of the steel plates, one on each face. Each patch consisted of 46 SMA wires with diameter of 0.787 mm and length of 228 mm. The SMA wires were embedded 76 mm into CFRP patches at both ends. The spacing among the wires was equal to the diameter of the wires, 0.787 mm. The resulting SMA/CFRP patch was 355.6 mm long and 76.2 mm wide. The patches were bonded on either side of a notched steel plate with the SMA wires bridging the crack path as shown in FIG. 16(a). For the samples with SMA and CFRP bridging the crack, the SMA/CFRP patch was overlaid with two layers of carbon fiber with length of 406.4 mm and width of 76.2 mm. FIG. 16 a) illustrates the SMA/CFRP patch; FIG. 16 b) illustrates the final reinforcement with the two layers carbon fiber overlay.

Three stress ranges were considered: 90 MPa, 153 MPa, and 217 MPa. Three samples of each testing configuration were tested. The measured fatigue lives of the tested coupons are summarized in Table 4 below.

TABLE 4

| Configuration | Repetition | Stress range [MPa]/Stress ratio | Fatigue life |
|---|---|---|---|
| Steel (control) | 1 | 217/0.1 | 17500 |
| | 2 | | 15297 |
| | 3 | | 15500 |
| Steel (control) | 1 | 153/0.1 | 44265 |
| | 2 | | 49868 |
| | 3 | | 48171 |
| Steel (control) | 1 | 90/0.1 | 354542 |
| | 2 | | 390947 |
| | 3 | | 326101 |
| CFRP | 1 | 217/0.1 | 23000 |
| | 2 | | 37000 |
| | 3 | | 86000 |
| CFRP | 1 | 153/0.1 | 354000 |
| | 2 | | 396000 |
| | 3 | | 488250 |
| CFRP | 1 | 90/0.1 | >4000000 |
| | 2 | | >4000000 |
| | 3 | | >4000000 |
| SMA | 1 | 153/0.1 | 93458 |

TABLE 4-continued

| Configuration | Repetition | Stress range [MPa]/Stress ratio | Fatigue life |
|---|---|---|---|
| | 2 | | 73495 |
| | 3 | | 69918 |
| SMA/CFRP | 1 | 153/0.1 | 862284 |
| | 2 | | 1151907 |
| | 3 | | 1749704 |
| SMA/CFRP | 1 | 217/0.1 | 220000 |
| | 2 | | 274846 |
| | 3 | | 174364 |

The results of the tests that were conducted at the stress range of 153 MPa provide the best basis of comparison. Overall, the following conclusions are notable. First, at the lowest stress range (90 MPa), application of the CFRP patch alone was sufficient to extend the average fatigue life of the tested coupons by 11 times from 357,197 cycles to at least 4,000,000 cycles. 4,000,000 cycles was defined as the cut-off point which defined an infinite fatigue life for the purposes of this study. Additional patches were not tested at the lowest stress range.

Second, at the middle stress range (153 MPa), installation of the CFRP patch alone increased the average fatigue life by 8.7 times from 47,434 cycles to 412,750 cycles. Installation of the SMA only patch configuration increased the average fatigue life by 66% to 78,957 cycles. Installation of the SMA/CFRP patch increased the average fatigue life by 26.5 times to 1,254,632 cycles.

Third, at the highest stress range (217 MPa) installing the CFRP only patch increased the fatigue life by 3.0 times from 16,099 cycles to 48,667 cycles. Installation of the SMA/CFRP patch increased the average fatigue life by 13.9 times to 223,070 cycles.

What is claimed is:

1. A method for repair of a crack in a structural element using a self-stressing composite patch, comprising:
    preparing a self-stressing patch comprising one or more prestrained shape memory alloy (SMA) wires, wherein the wires have terminal ends;
    embedding the terminal ends of the wires into tabs comprising fiber reinforced polymer (FRP), wherein the terminal ends of the wires are embedded in the tabs over a terminal embedment length, and wherein a central portion of the wires is not embedded in the tabs;
    affixing the tabs on opposite sides of the crack, whereby the central portion of the wires is substantially adjacent to the crack; and
    heating the central portion of the wires to activate the prestrained shape memory alloy (SMA), whereby a prestressing force is applied to the tabs as they are affixed on opposite sides of the crack.

2. The method of claim 1, further comprising the step of affixing a fiber reinforced polymer (FRP) overlay patch over the tabs and the wires, wherein the overlay patch is sized to completely overlay the tabs and the wires.

3. The method of claim 2, wherein the fiber reinforced polymer (FRP) of the overlay patch comprises carbon fibers embedded in an epoxy-based saturating resin.

4. The method of claim 2, wherein the fiber reinforced polymer (FRP) of the overlay patch is carbon fiber reinforced polymer (CFRP), glass fiber reinforced polymer (GFRP), aramid fiber reinforced polymer (AFRP), steel fiber reinforced polymer (SFRP), or basalt fiber reinforced polymer (BFRP).

5. The method of claim 1, wherein the shape memory alloy (SMA) is ternary nickel titanium alloy (NiTiNb).

6. The method of claim 1, wherein the fiber reinforced polymer (FRP) of the tabs comprises carbon fibers embedded in an epoxy-based saturating resin.

7. The method of claim 1, wherein the fiber reinforced polymer (FRP) of the tabs is carbon fiber reinforced polymer (CFRP), glass fiber reinforced polymer (GFRP), aramid fiber reinforced polymer (AFRP), or basalt fiber reinforced polymer (BFRP).

8. The method of claim 1, wherein the tabs have a length of about 180 mm.

9. The method of claim 1, wherein the terminal embedment length is about 100 mm.

10. The method of claim 1, wherein the wires have a length of about 300 mm.

11. The method of claim 1, wherein the self-stressing patch comprises about 10 to about 35 wires.

12. The method of claim 1, wherein the step of affixing the tabs comprises using an adhesive to affix the tabs to the structural element.

13. The method of claim 12, wherein the adhesive is an epoxy, vinyl ester, polyester, phenolic, or acrylic adhesive.

14. The method of claim 1, wherein the central portion of the wires is heated to a temperature of about 165° C.

* * * * *

UNITED STATES PATENT AND TRADEMARK OFFICE
CERTIFICATE OF CORRECTION

PATENT NO. : 10,450,750 B2  
APPLICATION NO. : 15/550297  
DATED : October 22, 2019  
INVENTOR(S) : Mina Dawood et al.

Page 1 of 1

It is certified that error appears in the above-identified patent and that said Letters Patent is hereby corrected as shown below:

In the Specification

1. In Column 4, Line 50, delete "12 IN" and insert -- 12 kN --, therefor.

Signed and Sealed this  
Fourteenth Day of April, 2020

Andrei Iancu  
*Director of the United States Patent and Trademark Office*